(12) United States Patent
Oguchi et al.

(10) Patent No.: US 10,587,805 B2
(45) Date of Patent: Mar. 10, 2020

(54) WEARABLE CAMERA AND METHOD FOR USING WEARABLE CAMERA

(71) Applicant: PANASONIC I-PRO SENSING SOLUTIONS CO., LTD., Fukuoka (JP)

(72) Inventors: Takae Oguchi, Fukuoka (JP); Minoru Hagio, Fukuoka (JP); Osamu Kanda, Fukuoka (JP); Youhei Koide, Fukuoka (JP)

(73) Assignee: PANASONIC I-PRO SENSING SOLUTIONS CO., LTD., Fukuoka (JP)

(*) Notice: Subject to any disclaimer, the term of this patent is extended or adjusted under 35 U.S.C. 154(b) by 0 days.

(21) Appl. No.: 16/259,214

(22) Filed: Jan. 28, 2019

(65) Prior Publication Data
US 2019/0306426 A1  Oct. 3, 2019

(30) Foreign Application Priority Data
Mar. 30, 2018 (JP) ................. 2018-067030

(51) Int. Cl.
| | | |
|---|---|---|
| H04N 5/232 | (2006.01) | |
| G06F 3/01 | (2006.01) | |
| H04N 5/247 | (2006.01) | |
| H04N 7/18 | (2006.01) | |

(52) U.S. Cl.
CPC ......... *H04N 5/23245* (2013.01); *G06F 3/015* (2013.01); *H04N 5/23206* (2013.01); *H04N 5/247* (2013.01); *H04N 7/181* (2013.01); *H04N 7/185* (2013.01); *H04N 7/188* (2013.01)

(58) Field of Classification Search
CPC .... H04N 5/23245; H04N 7/181; H04N 5/247; H04N 5/23206; H04N 7/185; H04N 7/188; G06F 3/015
See application file for complete search history.

(56) References Cited

U.S. PATENT DOCUMENTS

| | | | | |
|---|---|---|---|---|
| 10,123,702 | B1* | 11/2018 | Wilkins | .............. A61B 5/0002 |
| 2013/0342457 | A1* | 12/2013 | Cox | ........................ H05K 7/14 |
| | | | | 345/158 |
| 2014/0051047 | A1* | 2/2014 | Bender | ................. A61B 5/165 |
| | | | | 434/238 |
| 2014/0232885 | A1 | 8/2014 | Slater et al. | |
| 2014/0368643 | A1* | 12/2014 | Siegel | ............. G08B 13/19695 |
| | | | | 348/143 |
| 2016/0110208 | A1* | 4/2016 | Wagner | .............. G06F 9/44505 |
| | | | | 710/8 |

(Continued)

*Primary Examiner* — Nhan T Tran
(74) *Attorney, Agent, or Firm* — Greenblum & Bernstein, P.L.C.

(57) ABSTRACT

A wearable camera includes: a manipulator that receives operation by a user; a camera that picks up an image; a communicator that receives biological information on the user from a biosensor worn or owned by the user; and a controller that makes a transition from a vital reaction mode to a privacy mode in a case where the manipulator receives operation to specify the privacy mode, the vital reaction mode being a mode in which recording of the image picked-up by the camera is started when the biological information becomes abnormal, and the privacy mode being a mode in which image recording by the camera is not started even when the biological information becomes abnormal.

10 Claims, 11 Drawing Sheets

(56) References Cited

U.S. PATENT DOCUMENTS

| | | | | |
|---|---|---|---|---|
| 2016/0227173 | A1* | 8/2016 | Yamaguchi | H04N 7/185 |
| 2017/0018047 | A1* | 1/2017 | Hanchett | G06Q 50/265 |
| 2018/0063421 | A1* | 3/2018 | Yokomitsu | H04N 5/232 |
| 2018/0205876 | A1* | 7/2018 | Paulus | H04N 5/23216 |
| 2018/0249087 | A1* | 8/2018 | Arnold | G06F 3/16 |

* cited by examiner

WEARABLE CAMERA AND METHOD FOR USING WEARABLE CAMERA

CROSS REFERENCE TO RELATED APPLICATIONS

This application is entitled to and claims the benefit of Japanese Patent Application No. 2018-067030, filed on Mar. 30, 2018, the disclosure of which including the specification, drawings and abstract is incorporated herein by reference in its entirety.

TECHNICAL FIELD

The present disclosure relates to a wearable camera that starts image recording based on biological information on a user and a method for using the wearable camera.

BACKGROUND ART

In recent years, to efficiently support work of a police officer or a security guard, for example, operation of causing the police officer or the security guard to wear or own a wearable camera during patrol to record a picked-up image has been studied. In addition, an apparatus that picks up a picture and a video based on biorhythm of a user has been provided (for example, refer to PTL 1).

CITATION LIST

Patent Literature

PTL 1
U.S. Patent Application Publication No. 2014/0232885 specification

SUMMARY OF INVENTION

Technical Problem

In a case where the wearable camera starts the image recording based on biological information on the user, such as a heart rate, a perspiration amount, and body temperature, the wearable camera may start the image recording based on the biological information even in a situation where the image recording by the wearable camera is undesirable for the user.

One non-limiting embodiment of the present disclosure facilitates providing a wearable camera that enables a user to prohibit start of image recording based on biological information.

Solution to Problem

A wearable camera according to one aspect of the present disclosure is a wearable camera, including: a manipulator that receives operation performed by a user; a camera that picks up an image; a communicator that receives biological information on the user from a biosensor to be worn or owned by the user; and a controller that makes a transition from a vital reaction mode to a privacy mode in a case where the manipulator receives operation to specify the privacy mode, the vital reaction mode being a mode in which recording of the image picked-up by the camera is started when the biological information becomes abnormal, and the privacy mode being a mode in which image recording by the camera is not started even when the biological information becomes abnormal.

A method according to one aspect of the present disclosure is a method for using a wearable camera, in which the wearable camera includes a manipulator that receives operation performed by a user, and a camera that picks up an image, and in which the method comprises: receiving biological information on the user from a biosensor to be worn or owned by the user; and making a transition from a vital reaction mode to a privacy mode in a case where the manipulator receives operation specify a privacy mode, the vital reaction mode being a mode in which recording of the image picked-up by the camera is started when the biological information becomes abnormal, and the privacy mode being a mode in which image recording by the camera is not started even when the biological information becomes abnormal.

Note that these general and specific aspects may be implemented by a system, a method, an integrated circuit, a computer program, or a recording medium, or may be implemented by an optional combination of a system, an apparatus, a method, an integrated circuit, a computer program, and a recording medium.

Advantageous Effects of Invention

According to the aspect of the present disclosure, the user can prohibit start of the image recording based on the biological information.

Further advantages and effects in the aspect of the present disclosure will become apparent from the specification and the accompanying drawings. Such advantages and/or effects are provided by the features described in some embodiments as well as the specification and the accompanying drawings; however, it is not always necessary to provide all of the advantages and effects in order to obtain one or more identical features.

DESCRIPTION OF EMBODIMENTS

Some embodiments of the present disclosure are described in detail below with reference to accompanying drawings. Detailed description more than necessary is omitted in some cases. For example, detailed description of well-known matters and overlapping description for substantially the same configuration are omitted in some cases. This is to prevent the following description from becoming unnecessarily redundant and to facilitate understanding by those skilled in the art.

The accompanying drawings and the following description are provided in order for those skilled in the art to thoroughly understand the present disclosure, and do not intend to limit the subject matter defined in the appended claims.

(Embodiment 1)

Figure 1:
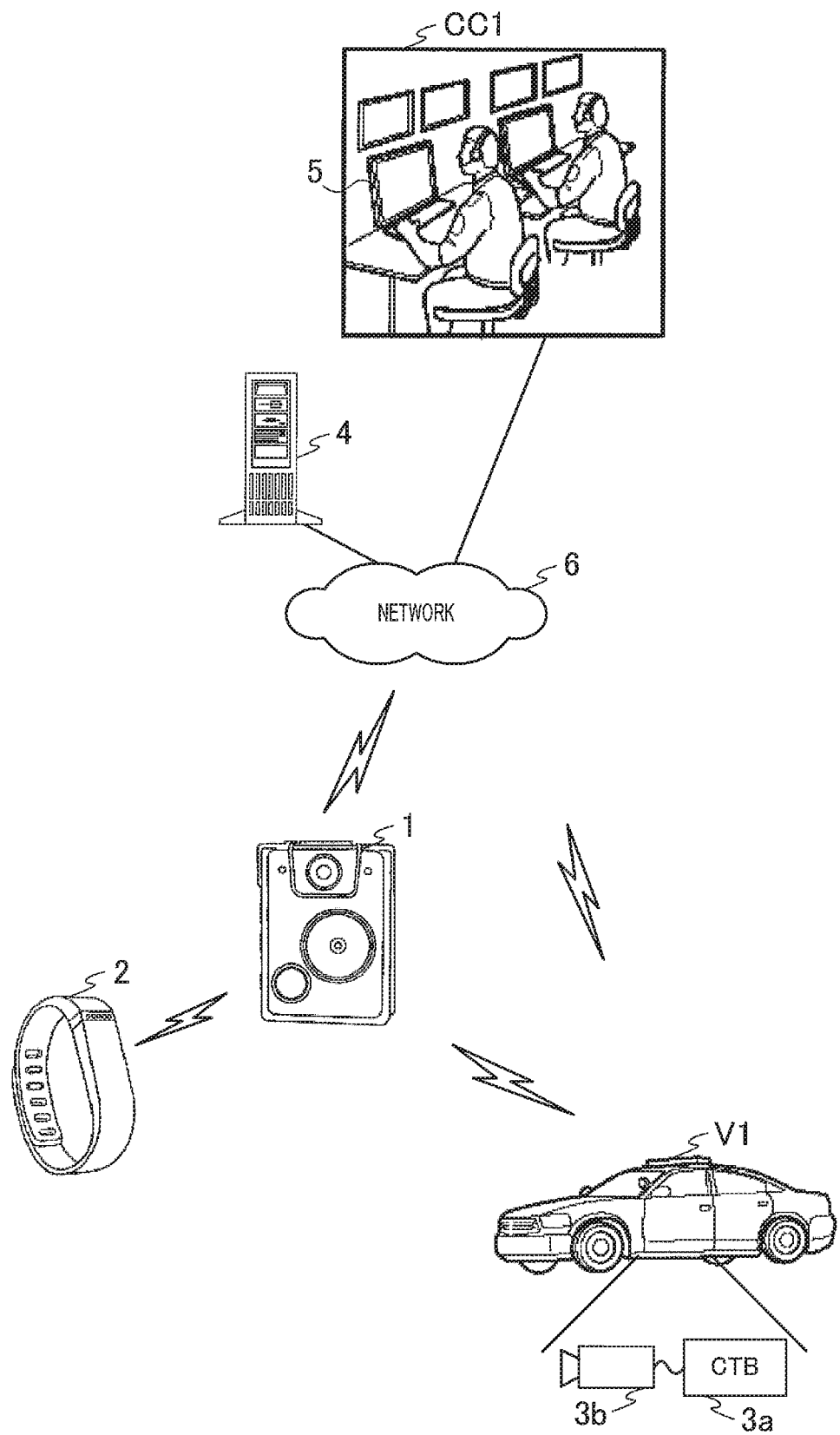
FIG. 1 is a diagram illustrating an example of a wearable camera system according to Embodiment 1.

FIG. 1 is a diagram illustrating an example of a wearable camera system according to Embodiment 1. As illustrated in FIG. 1, the wearable camera system includes wearable camera 1, biosensor 2, common trigger box (CTB) 3a mounted on vehicle V1, on-vehicle camera 3b mounted on vehicle V1, server 4, and terminal apparatus 5 disposed in command center CC1.

Figure 2:
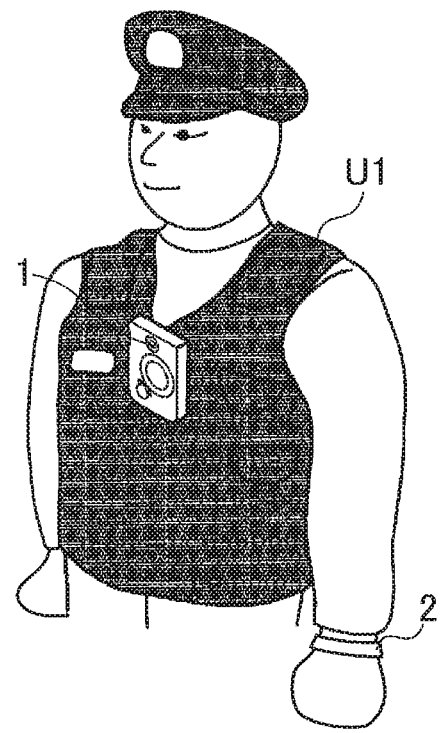
FIG. 2 is a diagram illustrating an example of an upper half body of a user wearing a wearable camera and a biosensor.

Wearable camera 1 is worn or owned by, for example, a police officer or a security guard (for example, see FIG. 2). Wearable camera 1 communicates with biosensor 2 through short-range wireless communication such as Bluetooth®. Wearable camera 1 also communicates with CTB 3a through the short-range wireless communication such as Bluetooth®. In addition, wearable camera 1 communicates with server 4 through network 6 including, for example, a wireless network for a mobile phone and the Internet. In the following, the police officer, the security guard, or the like wearing or owning wearable camera 1 may be referred to as a user. Further, in the following, it is assumed that the user wears wearable camera 1.

Biosensor 2 is worn or owned by the user wearing wearable camera 1 (for example, see FIG. 2). Biosensor 2 acquires biological information on the user, such as a heart rate, perspiration, and body temperature. Biosensor 2 transmits the acquired biological information on the user to wearable camera 1 through the short-range wireless communication such as Bluetooth®. In the following, it is assumed that the user wears biosensor 2.

Vehicle V1 is, for example, a police vehicle or a security vehicle, CTB 3a is connected to on-vehicle devices, for example, a rotary warning lamp or a siren of vehicle V1. CTB 3a controls start and stop of image recording by on-vehicle camera 3b and wearable camera 1, based on a signal output from the on-vehicle devices. On-vehicle camera 3b is attached to, for example, at least one of a front glass and a rear glass of vehicle V1, and picks up an image on at least one of front side and rear side of vehicle V1. CTB 3a communicates with server 4 through, for example, network 6.

Server 4 stores an image transmitted from wearable camera 1. Server 4 transmits the stored image of wearable camera 1 to terminal apparatus 5 in response to request from terminal apparatus 5. Further, server 4 stores an image transmitted from on-vehicle camera 3b. Server 4 transmits the stored image of vehicle V1 to terminal apparatus 5 in response to request from terminal apparatus 5.

Command center CC1 is, for example, a command center of a police station or a security company. Terminal apparatus 5 is disposed in command center CC1. Terminal apparatus 5 communicates with server 4 through network 6.

The image recorded by wearable camera 1 is displayed on a display of terminal apparatus 5. In addition, the image recorded by on-vehicle camera 3b is displayed on the display of terminal apparatus 5. An operator operating terminal apparatus 5 issues an instruction or the like to, for example, the user wearing wearable camera 1.

Wearable camera 1 and biosensor 2 may communicate with each other through a mobile terminal such as a smartphone. Further, wearable camera 1 and biosensor 2 may communicate with each other through, for example, a wireless LAN (Local Area Network). Moreover, wearable camera 1 and CTB 3a may communicate with each other through, for example, the wireless LAN.

Biosensor 2 may acquire, as the biological information, at east one of a heart rate, perspiration, and body temperature of the user. The biological information acquired by biosensor 2 is not limited to the heart rate, the perspiration, and the body temperature of the user. The biological information acquired by biosensor 2 may include, for example, blood pressure.

CTB 3a may be a VPU (Video Processing Unit). CTB 3a and the VPU may be also referred to as on-vehicle monitoring apparatuses. Server 4 may be disposed in command center CC1.

FIG. 2 is a diagram illustrating an example of an upper half body of the user wearing wearable camera 1 and biosensor 2. In FIG. 2, the same apparatuses as those in FIG. 1 are denoted by the same reference numerals.

Wearable camera 1 is attached or held to a front part of a uniform of user U1 in order to image the front side of user U1. For example, wearable camera 1 may be fixed to the front part of the uniform while being hung from a neck by a string. Wearable camera 1 may be fixed to the front part of the uniform through engagement of a mounting tool (for example, mounting clip) attached on a rear surface of a housing of wearable camera 1 and a mounted tool attached to the front part of the uniform.

Biosensor 2 is worn around, for example, a wrist of user U1 Biosensor 2 acquires the biological information on user U1 such as the heart rate, the perspiration, and the body temperature from the wrist of user U1. Biosensor 2 transmits the acquired biological information to wearable camera 1.

Wearable camera 1 receives the biological information transmitted from biosensor 2. Wearable camera 1 determines whether the received biological information is normal or abnormal.

For example, in a ease where a value of the biological information is within a predetermined range, wearable camera 1 determines that the biological information is normal. In a case where the value of the biological information is out of the predetermined range, wearable camera 1 determines that the biological information is abnormal. More specifically, when the heart rate of user U1 is within the predetermined range, wearable camera 1 determines that the biological information is normal. In contrast, when the heart rate of user U1 is out of the predetermined range, wearable camera 1 determines that the biological information is abnormal. Note that when the heart rate, the perspiration amount, the body temperature, and the like are all within the predetermined range, wearable camera 1 may determine that the biological information on user U1 is normal. When any one of the heart rate, the perspiration amount, the body temperature, and the like is out of the predetermined range, wearable camera 1 may determine that the biological information on user U1 is abnormal.

In a case where the biological information on user U1 is abnormal, it is considered that an incident or the like has occurred. For example, when an incident occurs, user U1 may feel tension or close with a suspicious person. As a result, the body temperature and the heart of user U1 are increased to cause the biological info to be abnormal.

Accordingly, in the case where the biological information on user U1 received from biosensor 2 indicates the abnormal state, wearable camera 1 automatically (autonomously) starts image recording even without operation to start image recording by user U1. As a result, for example, an evidence image of the incident is automatically recorded by wearable camera 1.

On the other hand, there is a situation where start of image recording by wearable camera 1 is undesirable for user U1. For example, start of image recording by wearable camera 1 is undesirable for user U1 during a break or the like. Even during the break or the like, however, when the heart rate or the like of user U1 is increased, wearable camera 1 determines that the biological information on user U1 has become abnormal and starts image recording.

Accordingly, in a case where wearable camera 1 receives operation to specify privacy mode from user U1, wearable camera 1 does not start image recording even when the biological information becomes abnormal. In other words, in the case where wearable camera 1 receives the operation to specify the privacy mode from user U1, wearable camera 1 prohibits start of image recording.

Figure 3:
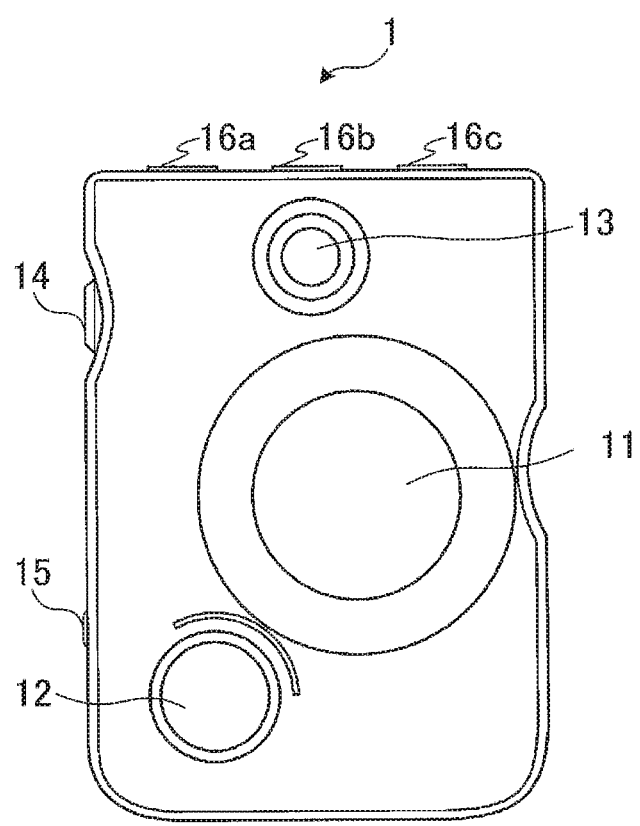
FIG. 3 is a diagram illustrating an appearance example of the wearable camera.

FIG. 3 is a diagram illustrating an appearance example of wearable camera 1. As illustrated in FIG. 3, switches 11 and 12 and camera lens 13 are disposed on a front surface of the housing of wearable camera 1. Switches 14 and 15 are disposed on a side surface of the housing of wearable camera 1. LEDs (Light Emitting Diodes) 16a to 16c are disposed on a top surface of the housing of wearable camera 1.

When switch 11 is pressed short, wearable camera 1 starts moving image pickup (recording) Further, when switch 11 is pressed long, wearable camera 1 stops the moving image pickup (recording). As described above, wearable camera 1 also starts the moving image pickup (recording) based on the biological information transmitted from biosensor 2. In other words, wearable camera 1 starts the moving image pickup based on a condition of the user (for example, getting nervous or running due to occurrence of incident) even without operation of switch 11 by the user.

Wearable camera 1 picks up (records) a still image in response to pressing of switch 12. Camera lens 13 forms an optical image of an object on an imaging surface of the camera.

Wearable camera 1 communicates with an external device in response to pressing of switch 14. For example, wearable camera 1 transmits information (including recorded image) stored in a storage apparatus described later, to server 4, CTB 3a of vehicle V1, or a smartphone of the user, in response to pressing of switch 14.

Wearable camera 1 includes the privacy mode and a vital reaction mode. When switch 15 is pressed, wearable camera 1 makes a transition to the privacy mode. When wearable camera 1 makes a transition to the privacy mode, wearable camera 1 does not start image recording even when the biological information transmitted from biosensor 2 becomes abnormal.

When switch 15 is repeatedly pressed, wearable camera 1 switches the mode between the privacy mode and the vital reaction mode. For example, wearable camera 1 makes a transition to the privacy mode when switch 15 is pressed once, and wearable camera 1 makes a transition to the vital reaction mode when switch 15 is pressed again. The switch to change the mode to the privacy mode and the switch to change the mode to the vital reaction mode may be different from each other. For example, wearable camera 1 may make a transition to the privacy mode when a certain switch is pressed, and wearable camera 1 may make a transition to the vital reaction mode when another switch is pressed.

LEDs 16a to 16c each indicates a state of wearable camera 1. For example, LEDs 16a to 16c indicate whether wearable camera 1 is in the privacy mode or in the vital reaction mode. In addition, for example, LEDs 16a to 16c indicate whether wearable camera 1 is performing image recording. In addition, for example, LEDs 16a to 16c indicate whether wearable camera 1 is communicating with an external device.

Figure 4:
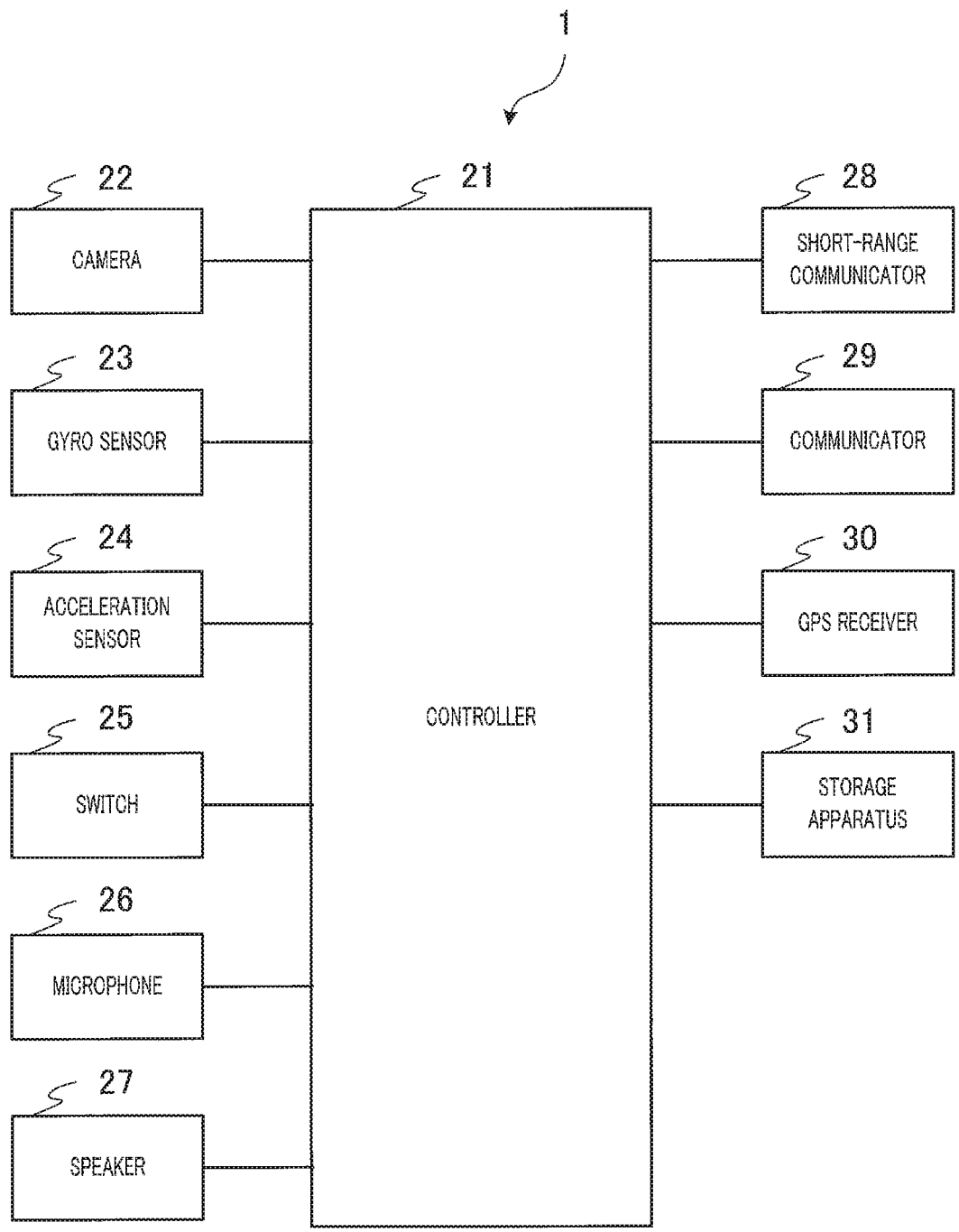
FIG. 4 is a diagram illustrating an example of a block configuration of the wearable camera.

FIG. 4 is a diagram illustrating an example of a block configuration of wearable camera 1. As illustrated in FIG. 4, wearable camera 1 includes controller 21, camera 22, gyro sensor 23, acceleration sensor 24, switch 25, microphone 26, speaker 27, short-range communicator 28, communicator 29, GPS (Global Positioning System) receiver 30, and storage apparatus 31.

Controller 21 controls the whole of wearable camera 1. Functions of controller 21 may be realized by a processor such as a CPU (Central Processing Unit) and a DSP (Digital Signal Processor).

Camera 22 includes a solid-state image pickup device and camera lens 13 illustrated in FIG. 3. The lid-state image pickup device is, for example, a CCD (Charge Coupled Device) image sensor or a CMOS (Complementary Metal Oxide Semiconductor) image sensor. Camera 22 outputs an image signal output from the solid-state image pickup device, to controller 21 in a form of, for example, a digital signal.

Gyro sensor 23 measures, for example, an angular velocity around three axes (x axis, y axis, and z axis) of an orthogonal coordinate system. Gyro sensor 23 outputs the measured angular velocity to controller 21 in a form of, for example, a digital signal Acceleration sensor 24 measures, for example, acceleration in the three axis directions of the orthogonal coordinate system. Acceleration sensor 24 outputs the measured acceleration to controller 21 in a form of, for example, a digital signal. Controller 21 can detect motion of the user wearing wearable camera 1 such as start of walking, start of running, and falling from the angular velocity output from gyro sensor 23 and the acceleration output from acceleration sensor 24.

Switch 25 is an input apparatus that receives operation by the user. Switch 25 includes switches 11, 12, 14, and 15 illustrated in FIG. 3. Switch 25 outputs information corresponding to the operation by the user to controller 21 in a form of, for example, a digital signal.

Microphone 26 collects sound around wearable camera 1 and collects voice of the user wearing wearable camera 1. Microphone 26 outputs a signal of the collected sound to controller 21 in a form of, for example, a digital signal.

Speaker 27 converts a voice signal output from controller 21 into voice and outputs the voice.

Short-range communicator 28 performs the short-range wireless communication with biosensor 2 through, for example, Bluetooth®. Further, short-range communicator 28 performs the short-range wireless communication with CTB 3a of vehicle V1 through, for example, Bluetooth®. Short-range communicator 28 may perform the short-range wireless communication with biosensor 2 through, for example, a smartphone owned by the user.

Communicator 29 communicates with server 4 through network 6.

GPS receiver 30 receives GPS signals transmitted from a plurality of GPS transmitters. GPS receiver 30 calculates a position of wearable camera 1 based on the received GPS signal. GPS receiver 30 outputs the calculated position of wearable camera 1 to controller 21. Note that the position of wearable camera 1 may be calculated by controller 21 based on the GPS signal received by GPS receiver 30.

The image (moving image or still image) picked-up by camera 22 is stored in storage apparatus 31. The image stored in storage apparatus 31 is saved as, for example, art evidence image and cannot be erased. In addition, a program to be executed by the processor or data may be stored in storage apparatus 31. Storage apparatus 31 includes, for example, a ROM (Read Only Memory), a RAM (Random Access Memory), a flash memory, or an HDD (Hard Disk Drive). A storage apparatus in which the image is stored and a storage apparatus in which the program or the data is stored may be different from each other.

Figure 5:
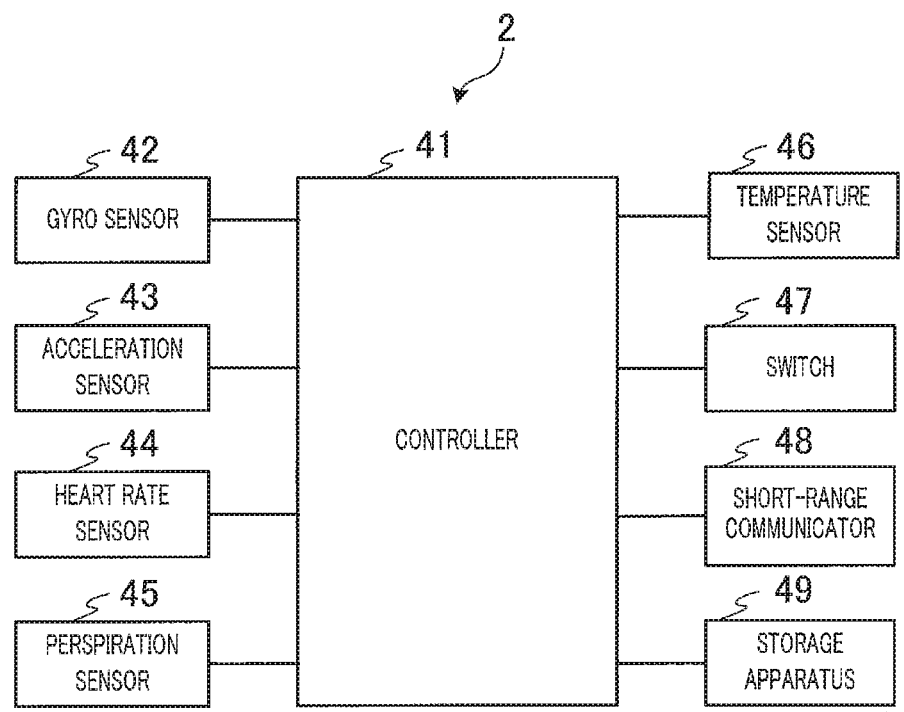
FIG. 5 is a diagram illustrating an example of a block configuration of the biosensor.

FIG. 5 is a diagram illustrating an example of a block configuration of biosensor 2. As illustrated in FIG. 5, biosensor 2 includes controller 41, gyro sensor 42, acceleration sensor 43, heart rate sensor 44, perspiration sensor 45, temperature sensor 46, switch 47, short-range communicator 48, and storage apparatus 49.

Controller 41 controls the whole of biosensor 2. Functions of controller 41 may be realized by a processor such as a CPU and a DSP.

Gyro sensor 42 measures, for example, an angular velocity around three axes of an orthogonal coordinate system. Gyro sensor 42 outputs the measured angular velocity to controller 41 in a form of, for example, a digital signal.

Acceleration sensor 43 measures, for example, acceleration in the three axis directions of the orthogonal coordinate system. Acceleration sensor 43 outputs the measured acceleration to controller 41 in a form of, for example, a digital signal.

Heart rate sensor 44 includes, for example, a light emitting device and a light receiving device, and applies light to a blood vessel of the user wearing biosensor 2 to receive reflected light thereof. Heart rate sensor 44 measures the heart rate of the user wearing biosensor 2 from variation of an amount of the received light. Heart rate sensor 44 outputs the measured heart rate of the user to controller 41 in a form of, for example, a digital signal.

Perspiration sensor 45 measures a perspiration amount of the user wearing biosensor 2 based on, for example, humidity near a skin. Perspiration sensor 45 outputs the measured perspiration amount to controller 41 in a form of, for example, a digital signal. Note that perspiration sensor 45 may measure presence/absence of perspiration of the user wearing biosensor 2.

Temperature sensor 46 measures the body temperature of the user wearing biosensor 2. Temperature sensor 46 outputs the measured body temperature to controller 41 in a form of; for example, a digital signal.

Switch 47 is an input apparatus that receives operation by the user. Switch 47 outputs information corresponding to the operation by the user to controller 41 in a form of, for example, a digital signal.

Short-range communicator 48 performs the short-range wireless communication with wearable camera 1 through, for example, Bluetooth®. Short-range communicator 48 may perform the short-range wireless communication with wearable camera 1 through, for example, a smartphone owned by the user.

In storage apparatus 49, the data measured by the various kinds of sensors are temporarily stored. In addition, programs to be executed by the processor or data are stored in storage apparatus 49. Storage apparatus 49 includes, for example, a ROM, a RAM, or a flash memory.

Figure 6:
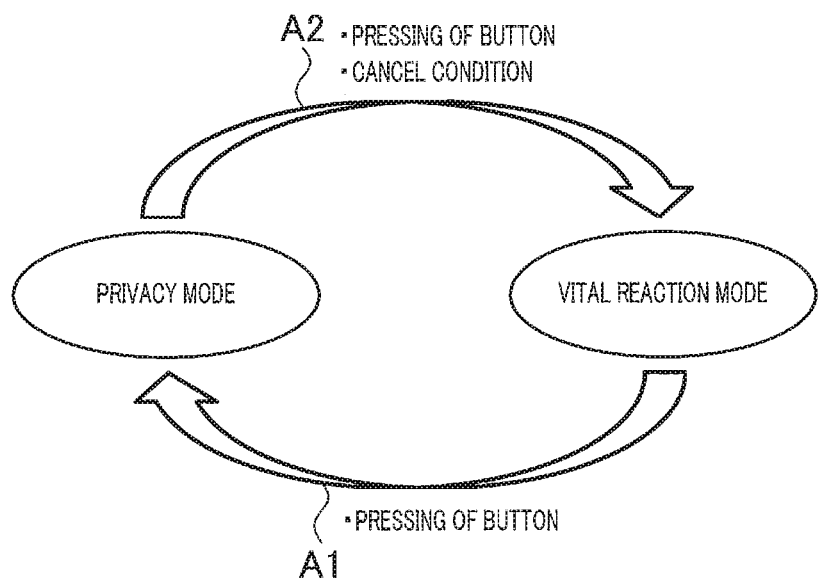
FIG. 6 is a diagram to explain mode transition of the wearable camera.

FIG. 6 is a diagram to explain mode transition of wearable camera 1. Wearable camera 1 operates in the vital reaction mode or in the privacy mode.

In the vital reaction mode, wearable camera 1 starts image recording by camera 22 based on the biological information transmitted from biosensor 2. For example, wearable camera 1 does not perform image recording by camera 22 when the biological information transmitted from biosensor 2 is normal, whereas wearable camera 1 starts image recording by camera 22 when the biological information becomes abnormal. In other words, in the vital reaction mode, wearable camera 1 starts image recording by camera 22, for example, when an incident or the like occurs and the heart rate, the body temperature, and the like of the user are accordingly increased. In addition, in the vital reaction mode, wearable camera 1 starts image recording in response to pressing of switch 11.

In the privacy mode, wearable camera 1 does not start image recording by camera 22 based on the biological information transmitted from biosensor 2. In other words, in the privacy mode, wearable camera 1 prohibits start of image recording based on the biological information. For example, even when the biological information transmitted from biosensor 2 becomes abnormal, wearable camera 1 does not perform image recording by camera 22. More specifically, in the privacy mode, even when the heart rate, the body temperature, and the like of the user are increased due to some kind of situation, wearable camera 1 does not start image recording by camera 22.

Wearable camera 1 makes a transition from the vital reaction mode to the privacy mode, or from the privacy mode to the vital reaction mode in response to pressing of switch 15.

For example, it is assumed that wearable camera 1 is currently in the vital reaction mode. When switch 15 is pressed once, wearable camera 1 makes a transition to the privacy mode as illustrated by arrow A1 in FIG. 6.

When switch 15 is pressed again, wearable camera 1 makes a transition to the vital reaction mode as illustrated by arrow A2 in FIG. 6.

Even when switch 15 is not pressed again, when a cancel condition is satisfied, wearable camera 1 makes a transition to the vital reaction mode as illustrated by arrow A2 in FIG. 6. Examples of the condition to cancel the privacy mode include the following conditions.

Image-Recording Instruction by CTB 3a

In a case where CTB 3a starts image recording by on-vehicle camera 3b, it is considered that an incident has occurred. In addition, in a case where CTB 3a receives a predetermined signal (for example, signal indicating operation of device) from the on-vehicle devices such as the rotary warning lamp and the siren, it is considered that an incident has occurred. In such a case, CTB 3a instructs wearable camera 1 to perform image recording. When receiving the image-recording instruction from CTB 3a, wearable camera 1 cancels the privacy mode (makes transition to vital reaction mode), and starts image recording. As a result, in a case where an incident or the like occurs, wearable camera 1 can start image recording even in the privacy mode.

Image-Recording Instruction by Pressing of Switch 11

In a case where switch 11 is pressed, wearable camera 1 cancels the privacy mode and starts image recording. As a result, wearable camera 1 can immediately start image recording in response to pressing of switch 11 even in the privacy mode.

Cancel of Privacy Mode Due to Timeout

When a predetermined time elapses, wearable camera 1 cancels the privacy mode and makes a transition to the vital reaction mode. In other words, when the predetermined time elapses after the mode is transited to the privacy mode, wearable camera 1 cancels the privacy mode and cancels prohibition of image-recording start based on the biological information. As a result, even when the user forgets operation to make a transition to the vital reaction mode, wearable camera 1 can return to the vital reaction mode after the predetermined time elapses. Note that the predetermined time may be changed by the user.

Pulling Out of Gun from Holster

In a case where a gun is pulled out from a holster, wearable camera 1 cancels the privacy mode and makes a transition to the vital reaction mode. For example, a sensor that detects pulling out of the gun is provided in the holster. When receiving information indicating pulling out of the gun, from the sensor provided in the holster through short-range communicator 28, wearable camera 1 cancels the privacy mode and makes a transition to the vital reaction mode. As a result, even when the user forgets operation to make a transition to the vital reaction d wearable camera 1 can return to the vital reaction mode when the gun is pulled out from the holster. Note that, when receiving the information indicating pulling out of the gun, from the sensor provided in the holster, wearable camera 1 may start image recording.

Case Where User Moves to Specific Area

In a ease where the user moves to a specific area, for example, in a case where the user moves to vehicle V1 from a place separated from vehicle V1, wearable camera 1 cancels the privacy mode and makes a transition to the vital reaction mode. This is because it is considered that, for example, the break has ended and the user has returned to vehicle V1 in this case. As a result, even when the user forgets operation to make a transition to the vital reaction mode, wearable camera 1 can return to the vital reaction mode after the user moves to the specific area. Note that wearable camera 1 can detect movement of the user to the specific area (vehicle V1) based on presence/absence of connection of the short-range wireless communication with CTB 3a of vehicle V1. Alternatively, wearable camera 1 may detect movement of the user to the specific area based on the position output from GPS receiver 30.

Movement of User by Predetermined Distance

In a case where the user moves a predetermined distance, wearable camera 1 cancels the privacy mode and makes a transition to the vital reaction mode. This is because it is considered that the break or the like of the user has ended in this case. As a result, even when the user forgets operation to make a transition to the vital reaction mode, wearable camera 1 can return to the vital reaction mode after the user moves the predetermined distance. Note that wearable camera 1 can calculate the moving distance of the user from, for example, the acceleration measured by acceleration sensor 24 or the position output by GPS receiver 30.

Figure 7:
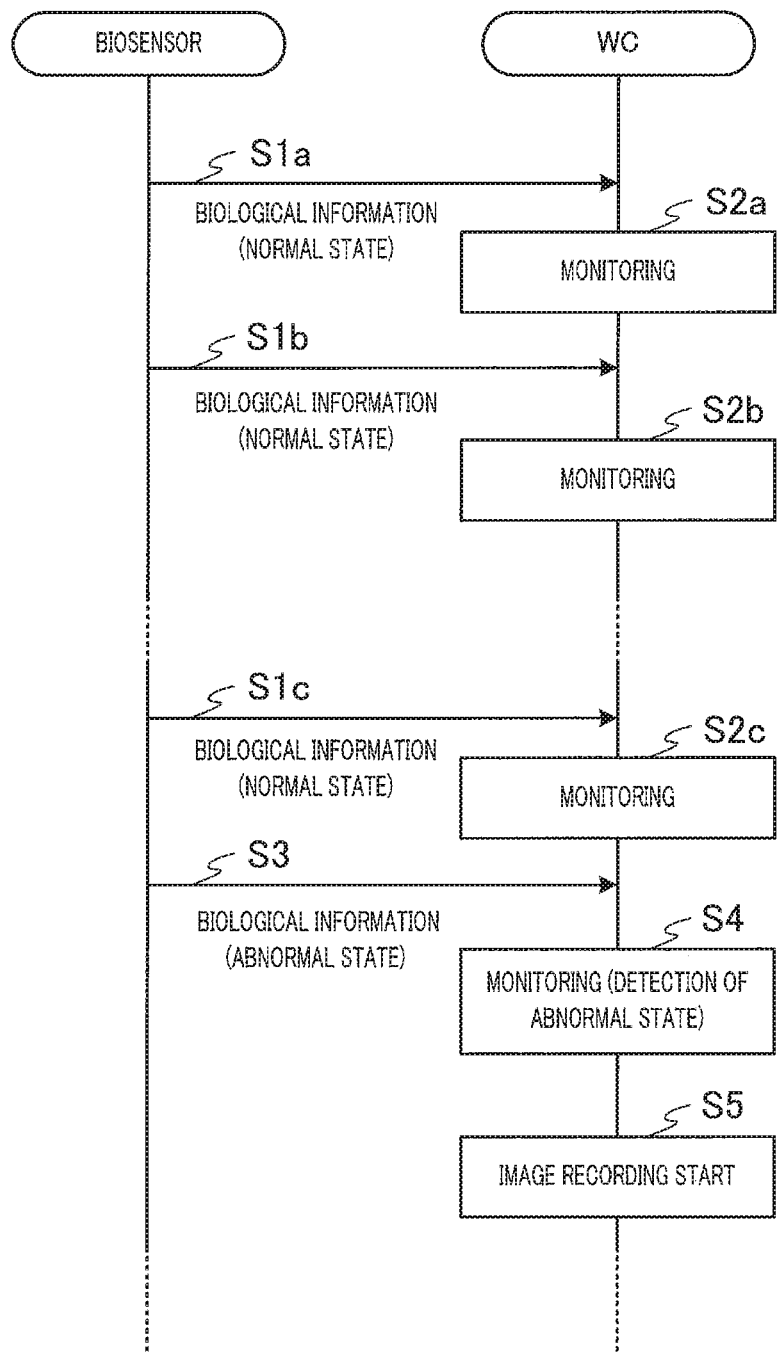
FIG. 7 is a sequence diagram to explain an operation example in a vital reaction mode.

FIG. 7 is a sequence diagram to explain an operation example in the vital reaction mode. It is assumed that wearable camera (WC) 1 operates in the vital reaction mode.

Heart rate sensor 44, perspiration sensor 45, and temperature sensor 46 of biosensor 2 respectively periodically measure the heart rate, the perspiration amount, and the body temperature of the user. Controller 41 periodically transmits the biological information that includes the heart rate, the perspiration amount, and the body temperature periodically measured by the respective sensors, to wearable camera 1 through short-range communicator 48 (step S1a to step S1c).

Short-range communicator 28 of wearable camera 1 receives the biological information transmitted in step S1a to step S1c. Controller 21 monitors the biological information received by short-range communicator 28, namely, determines whether the biological information is normal or abnormal (step S2a to step S2c). In other words, controller 21 determines whether a value of the biological information is within a predetermined range. Note that it is assumed that the biological information transmitted in step S1a to step S1c is normal.

Heart rate sensor 44, perspiration sensor 45, and temperature sensor 46 of biosensor 2 respectively measure the heart the perspiration amount, and the body temperature of the user. Controller 41 transmits the biological information that includes the heart rate, the perspiration amount, and the body temperature measured by the respective sensors, to wearable camera 1 through short-range communicator 48 (step S3). Note that it is assumed that the biological information on the user transmitted in step S3 is abnormal, for example, due to occurrence of an incident.

Short-range communicator 28 of wearable camera 1 receives the biological information transmitted in step S3. Controller 21 monitors the biological information received by short-range communicator 28 (step S4). Since the biological information transmitted in step S3 is abnormal, controller 21 determines (detects) that the biological information on the user wearing biosensor 2 is abnormal.

Since controller 21 determines that the biological information on the user is abnormal in step S4, controller 21 starts image recording by camera 22 (step S5). As a result, the image picked-up by camera 22 is stored in storage apparatus 31 as, for example, an evidence image of the incident.

Figure 8:
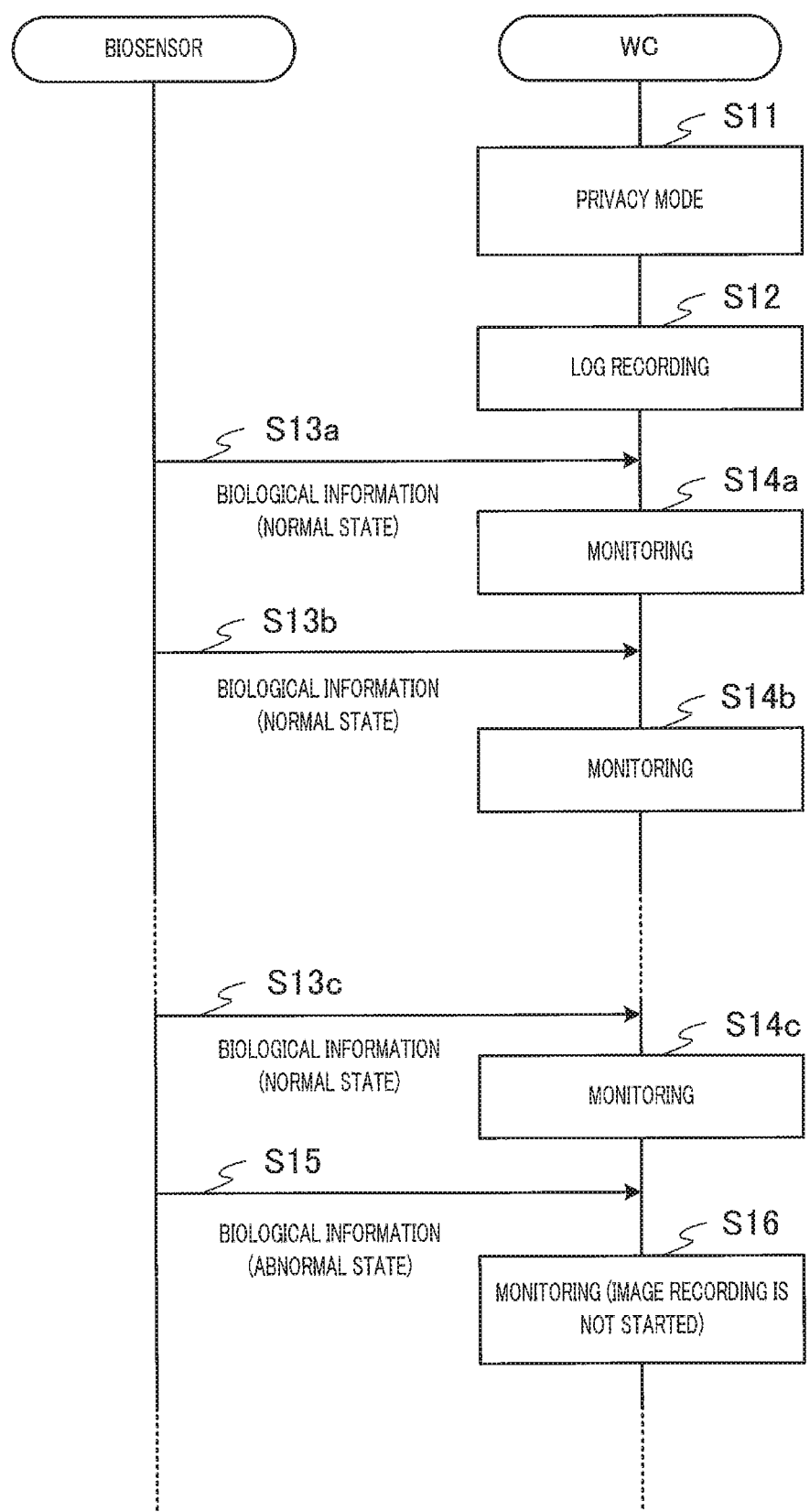
FIG. 8 is a sequence diagram to explain an operation example in a privacy mode.

FIG. 8 is a sequence diagram to explain an operation example in the privacy mode. It is assumed that wearable camera 1 operates in the vital reaction mode.

When switch 15 is pressed, controller 21 of wearable camera 1 makes a transition to the privacy mode (step S11). Controller 21 prohibits start of image recording based on the biological information from biosensor 2 because of transition to the privacy mode.

When the mode is transited to the privacy mode, controller 21 stores a log indicating transition to the privacy mode together with a time in storage apparatus 31 (step S12). In other words, an operation log of the user wearing wearable camera 1 is stored in storage apparatus 31.

Heart rate sensor 44, perspiration sensor 45, and temperature sensor 46 of biosensor 2 respectively periodically measure the heart rate, the perspiration amount, and the body temperature of the user. Controller 41 periodically transmits the biological information that includes the heart rate, the perspiration amount, and the body temperature periodically acquired by the respective sensors, to wearable camera 1 through short-range communicator 48 (step S13*a* to step S13*c*).

Short-range communicator 28 of wearable camera 1 receives the biological information transmitted in step S13*a* to step S13*c*. Controller 21 monitors the biological information received by short-range communicator 28 (step S14*a* to step S14*c*). In other words, controller 21 determines whether a value of the biological information is within a predetermined range. Note that it is assumed that the biological information transmitted in step S13*a* to step S13*c* is normal Heart rate sensor 44, perspiration sensor 45, and temperature sensor 46 of biosensor 2 respectively measure the heart rate, the perspiration amount, and the body temperature of the user. Controller 41 transmits the biological information that includes the heart rate, the perspiration amount, and the body temperature measured by the respective sensors, to wearable camera 1 through short-range communicator 48 (step S15). Note that it is assumed that the biological information on the user transmitted in step S15 is abnormal, for example, due to occurrence of an incident.

Short-range communicator 28 of wearable camera 1 receives the biological information transmitted in step S15. Controller 21 monitors the biological information received by short-range communicator 28 (step S16). Although the biological information transmitted in step S15 is abnormal, controller 21 does not start image recording by camera 22 because wearable camera 1 currently operates in the privacy mode.

Note that controller 21 monitors the biological information transmitted from biosensor 2 (for example, steps S14*a* to S14*c*, and S16) after transition to the privacy mode; however, controller 21 may not perform monitoring (may ignore biological information). In other words, in the privacy mode, controller 21 may not monitor the biological information transmitted from biosensor 2.

Figure 9:
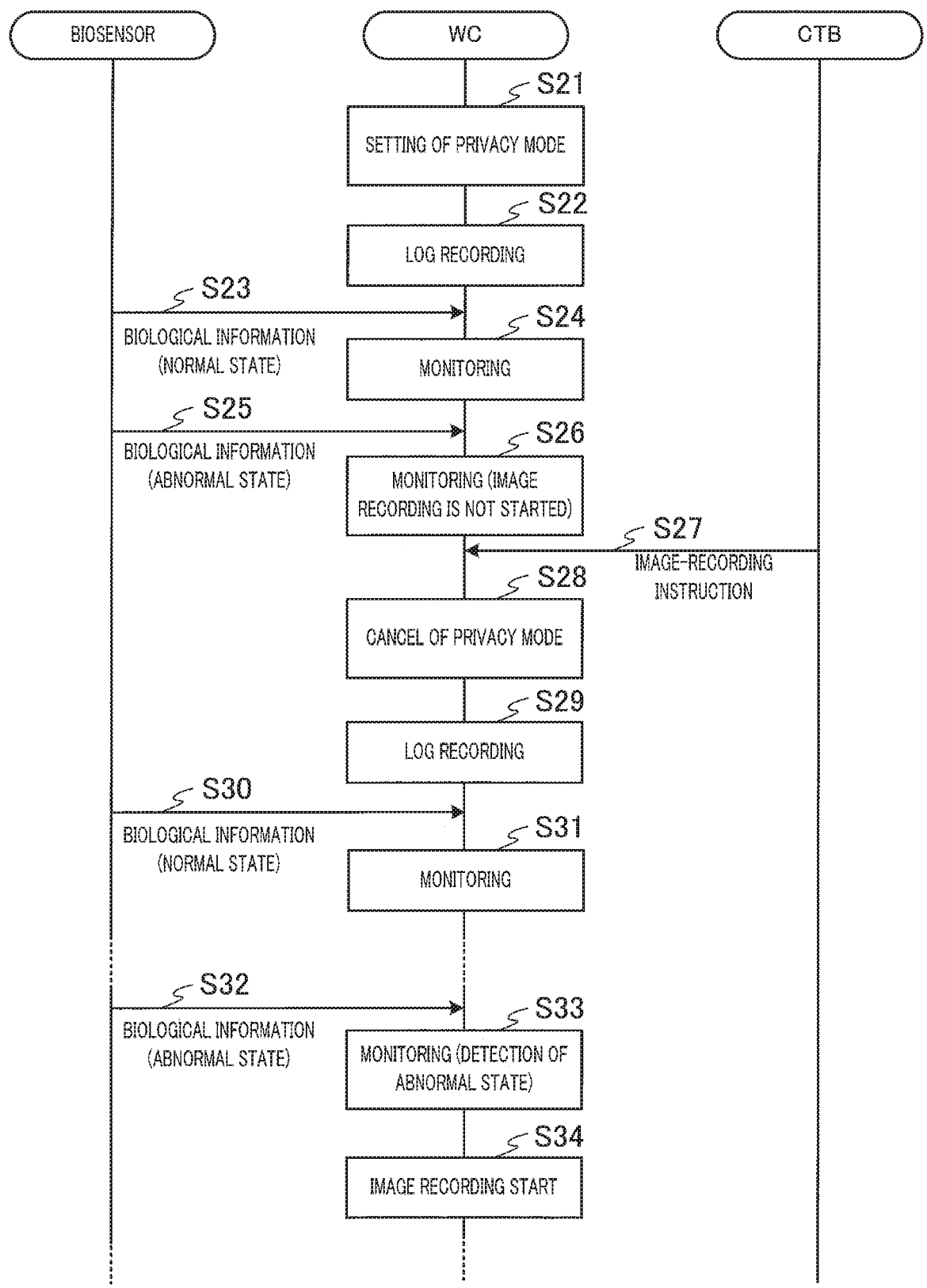
FIG. 9 is a sequence diagram to explain an example of operation to cancel the privacy mode.

FIG. 9 is a sequence diagram to explain an example of operation to cancel the privacy mode. In FIG. 9, an example in which the privacy mode is canceled in response to an instruction to start image recording from CTB 3*a* is described. It is assumed that wearable camera 1 operates in the vital reaction mode.

When switch 15 is pressed, controller 21 of wearable camera 1 makes a transition to the privacy mode (step S21). Controller 21 prohibits start of image recording based on the biological information because of transition to the privacy mode.

When the mode is transited to the privacy mode, controller 21 stores a log indicating transition to the privacy mode together with a tune in storage apparatus 31 (step S22). In other words, an operation log of the user wearing wearable camera 1 is stored in storage apparatus 31.

Heart rate sensor 44, perspiration sensor 45, and temperature sensor 46 of biosensor 2 respectively measure the heart rate, the perspiration amount, and the body temperature of the user. Controller 41 transmits the biological information that includes the heart rate, the perspiration amount, and the body temperature measured by the respective sensors, to wearable camera 1 through short-range communicator 48 (step S23). Note that it is assumed that the biological information transmitted in step S23 is normal.

Short-range communicator 28 of wearable camera 1 receives the biological information transmitted in step S23. Controller 21 monitors the biological information received by short-range communicator 28 (step S24).

Heart rate sensor 44, perspiration sensor 45, and temperature sensor 46 of biosensor 2 respectively measure the heart rate, the perspiration amount, and the body temperature of the user. Controller 41 transmits the biological information that includes the heart rate, the perspiration amount, and the body temperature measured by the respective sensors, to wearable camera 1 through short-range communicator 48 (step S25). Note that it is assumed that the biological information on the user transmitted in step S25 is abnormal, for example, due to occurrence of an incident.

Short-range communicator 28 of wearable camera 1 receives the biological information transmitted in step S25. Controller 21 monitors the biological information received by short-range communicator 28 (step S26). Although the biological information transmitted in step S25 is abnormal, controller 21 does not start image recording by camera 22 because wearable camera 1 currently operates in the privacy mode.

CTB 3*a* transmits an instruction to start image recording to wearable camera 1. Short-range communicator 28 of wearable camera 1 receives the instruction to start image recording, transmitted from CTB 3*a* (step S27).

Controller 21 cancels the privacy mode in response to the image-recording instruction received in step S27 (step S28).

When canceling the privacy mode, controller 21 stores a log indicating cancel of the privacy mode together with a time in storage apparatus 31 (step S29). In other words, the log indicating that the privacy mode has been canceled based on the image-recording instruction by CTB 3*a* is stored in storage apparatus 31.

Heart rate sensor 44, perspiration sensor 45, and temperature sensor 46 of biosensor 2 respectively measure the heart rate, the perspiration amount, and the body temperature of the user. Controller 41 transmits the biological information that includes the heart rate, the perspiration amount, and the body temperature measured by the respective sensors, to wearable camera 1 through short-range communicator 48 (step S30). Note that it is assumed that the biological information transmitted in step S30 is normal.

Short-range communicator 28 of wearable camera 1 receives the biological information transmitted in step S30. Controller 21 monitors the biological information received by short-range communicator 28 (step S31). Note that the biological information transmitted in step S30 is normal. Therefore, controller 21 determines that the biological information is within the predetermined range, and does not start image recording by camera 22.

Heart rate sensor 44, perspiration sensor 45, and temperature sensor 46 of biosensor 2 respectively measure the heart rate, the perspiration amount, and the body temperature of the user. Controller 41 transmits the biological information that includes the heart rate, the perspiration amount, and the body temperature measured by the respective sensors, to wearable camera 1 through short-range communicator 48 (step S32). Note that it is assumed that the biological information transmitted in step S32 is abnormal, for example, due to occurrence of an incident.

Short-range communicator 28 of wearable camera 1 receives the biological information transmitted in step S32. Controller 21 monitors the biological information received by short-range communicator 28 (step S33). The biological information transmitted in step S32 is abnormal. Therefore, controller 21 determines that the biological information on the user wearing biosensor 2 is abnormal.

Since controller 21 determines in step S33 that the biological information on the user is abnormal, controller 21 starts image recording by camera 22 (step S34). As a result, the image picked-up by camera 22 is stored in storage apparatus 31 as, for example, an evidence image of an incident.

Note that, in the above description, controller 21 monitors the biological information (steps S31 and S33) after receiving the image-recording instruction from CTB 3*a* in step S27; however, controller 21 may start image recording without monitoring the biological information. In other words, controller 21 may proceed to step S34 after recording of the log in step S29, and start image recording.

Figure 10:
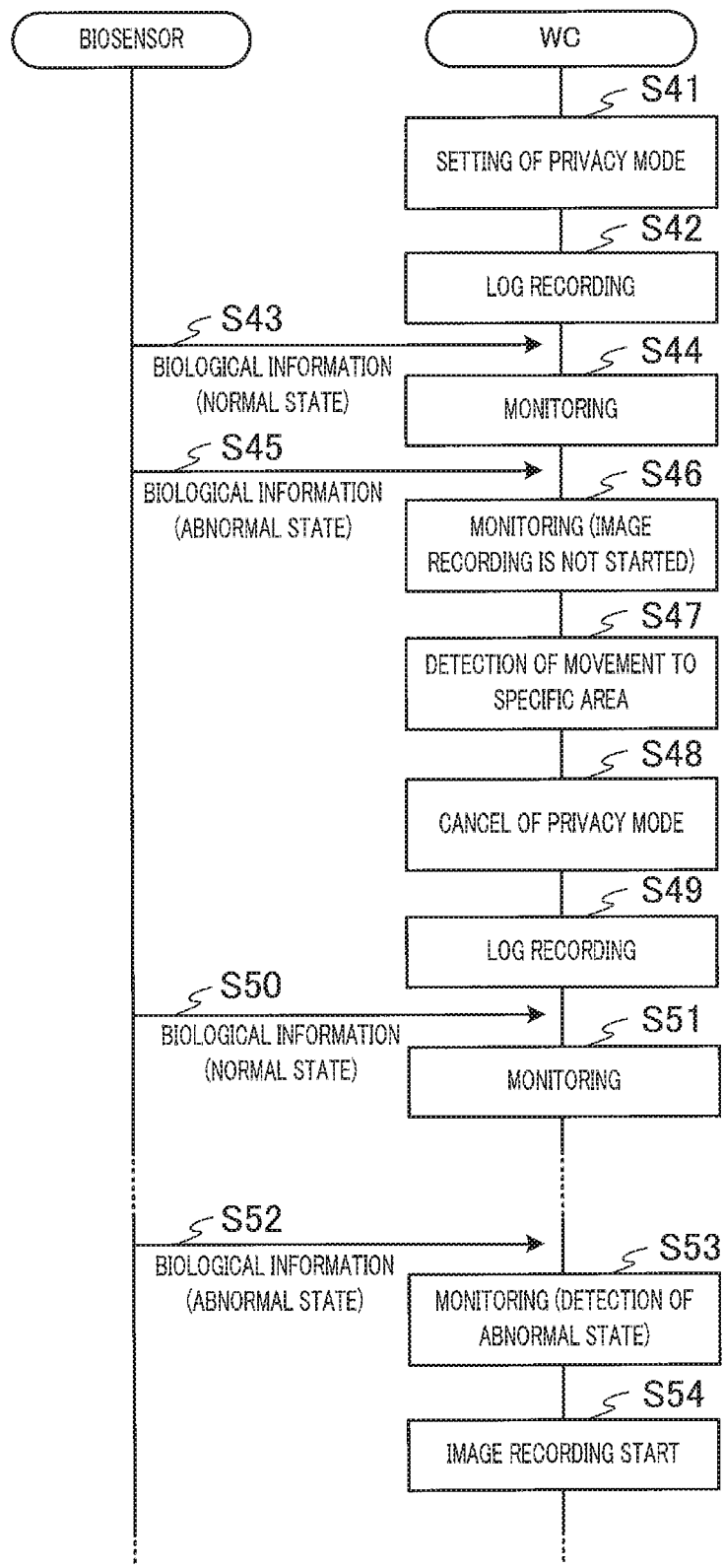
FIG. 10 is a sequence diagram to explain an example of the operation to cancel the privacy mode.

FIG. 10 is a sequence diagram to explain an example of operation to cancel the privacy mode. In FIG. 10, an example in which the privacy mode is canceled when movement of the user to a specific area is detected is described. It is assumed that wearable camera 1 operates in the vital reaction mode.

Processing in steps S41 to S46 illustrated in FIG. 10 is similar to the processing in steps S21 to S26 illustrated in FIG. 9, and description of the processing is therefore omitted.

Controller 21 of wearable camera 1 detects that the user has moved to the specific area (step S47). For example, controller 21 detects that the user has moved to vehicle V1 (specific area) from a place (for example, rest place) separated from vehicle V1.

Controller 21 cancels the privacy mode when detecting movement to the specific area in step S47 (step S48).

When canceling the privacy mode, controller 21 stores a log indicating cancel of the privacy mode together with a time in storage apparatus 31 (step S49). In other words, the log indicating that the privacy mode has been canceled based on movement of the user to the specific area is stored in storage apparatus 31.

Processing in steps S50 to S54 illustrated in FIG. 10 is similar to the processing in steps S30 to S34 illustrated in FIG. 9, and description of the processing is therefore omitted.

As described above, wearable camera 1 worn or owned by the user includes switches 11, 12, 14, and 15 that receive operation by the user, camera 22 that picks up an image in front of the user, short-range communicator 28 that receives the biological information on the user from biosensor 2 worn or owned by the user, and controller 21 that makes a transition from the vital reaction mode in which image recording by camera 22 is started when the biological information becomes abnormal, to the privacy mode in which image recording by camera 22 is not started even when the biological information becomes abnormal, in a case where switch 15 receives operation to specify the privacy mode. Accordingly, the user can prohibit start of image recording by wearable camera 1 based on the biological information. For example, the user can prohibit start of image recording by wearable camera 1 based on the biological information by pressing switch 15.

In a case where the value of the biological information is increased by a predetermined amount or is decreased by a predetermined amount, controller 21 of wearable camera 1 may determine that the biological information is abnormal. In other words, controller 21 may determine that the biological information is abnormal in a case where the value of the biological information is varied by a predetermined amount.

(Embodiment 2)

In Embodiment 2, in a case where the biological information on the user wearing biosensor 2 indicates a predetermined value, wearable camera 1 transmits a position of the user and an image picked-up by camera 22 to server 4. For example, in a case where the heart rate of the user wearing biosensor 2 is stopped (heart rate is "zero"), it is considered that abnormality has occurred on the user, and wearable camera 1 transmits the position of the user and the image picked-up by camera 22 to server 4. Server 4 transmits the position of the user and the image picked-up by camera 22 to terminal apparatus 5 disposed in command center CC1, and terminal apparatus 5 displays the position of the user and the image transmitted from server 4, on a display. This enables an operator of terminal apparatus 5 to know the position of the user in which abnormality has occurred and a condition around the user. In the following, differences from Embodiment 1 are described.

Figure 11:
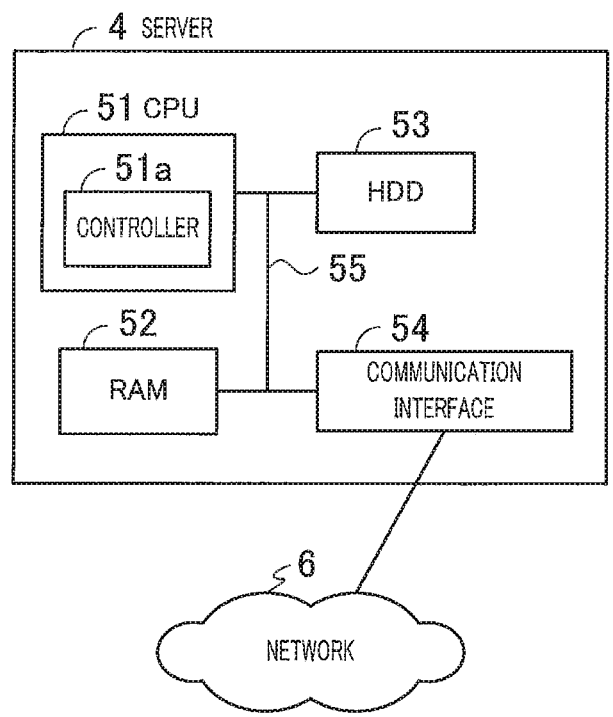
FIG. 11 is a diagram illustrating an example of a block configuration of a server according to Embodiment 2.

FIG. 11 is a diagram illustrating an example of a block configuration of server 4 according to Embodiment 2. As illustrated in FIG. 11, server 4 includes CPU 51, RAM 52, HDD 53, communication interface 54, and bus 55.

The whole of server 4 is controlled by CPU 51. CPU 51 functions as controller 51*a* of server 4. CPU 51 is connected to RAM 52, HDD 53, and communication interface 54 through bus 55.

A program of an OS (Operating System) to be executed by CPU 51 is temporarily stored in RAM 52. In addition, a program to display the position of the user wearing wearable camera 1, the image of wearable camera 1, and the like on the display of terminal apparatus 5 and various kinds of data necessary for processing by CPU 51 are temporarily stored in RAM 52. The OS, application programs, and the like are stored in HDD 53.

Server 4 may include a display, a keyboard, a mouse, and the like. Further, terminal apparatus 5 also includes blocks similar to the blocks in the block configuration example illustrated in FIG. 11. The controller of terminal apparatus 5, however, has a function different from the function of controller 51*a* of server 4.

In Embodiment 2, wearable camera 1 determines whether abnormality has occurred on the user wearing wearable camera 1, based on the biological information transmitted from biosensor 2. For example, in a case where the heart rate included in the biological information received from biosensor 2 is "zero", controller 21 of wearable camera 1 determines that abnormality has occurred on the user. When controller 21 determines abnormality of the user, controller 21 generates abnormality detection information that includes the position of the user and the image picked-up by camera 22, and transmits the abnormality detection information to server 4.

Controller 21 of wearable camera 1 starts image pickup by camera 22 when determining abnormality of the user. Camera 22 may pick up one or more still images or a moving image. In addition, controller 21 can acquire the position of the user at the time when abnormality of the user is determined, based on positional information output from GPS receiver 30.

Controller 51*a* of server 4 receives the abnormality detection information transmitted from wearable camera 1 through communication interface 54. When receiving the abnormality detection information, controller 51*a* displays a marker indicating the position of the user on a map displayed on the display of terminal apparatus 5, based on the position of the user included in the abnormality detection information received from wearable camera 1. In addition, for example, when a mouse pointer of the mouse included in terminal apparatus 5 is moved on or around the marker displayed on the display of terminal apparatus 5, controller 51*a* displays, on the display, the image included in the abnormality detection information received from wearable camera 1.

Figure 12:
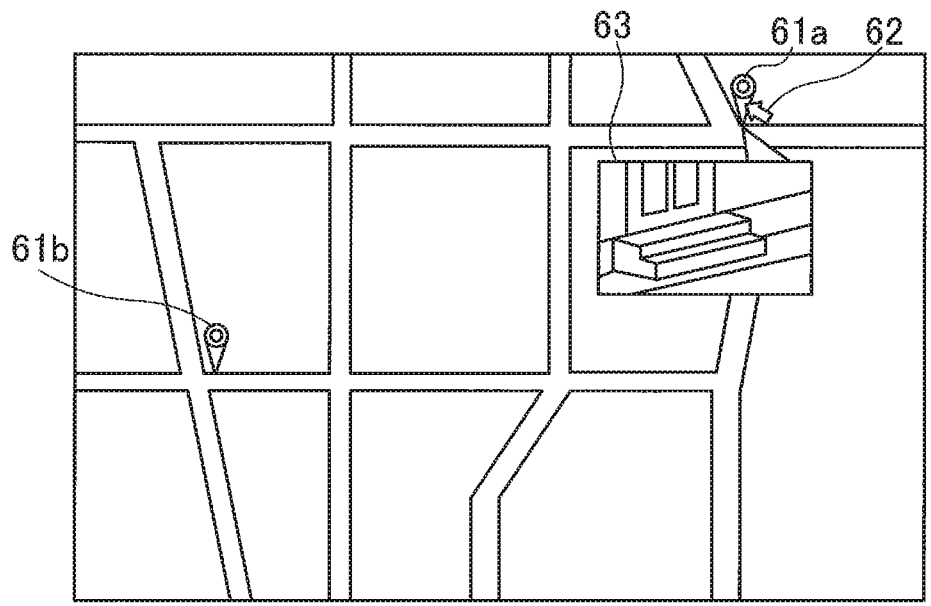
FIG. 12 is a diagram illustrating a screen example of a display of a terminal apparatus.

FIG. 12 is a diagram illustrating a screen example displayed on the display of terminal apparatus 5. In FIG. 12, it is assumed that user A wears wearable camera WCA, and user B wears wearable camera WCB. In addition, it is assumed that wearable cameras WCA and WCB have respectively determined abnormality of users A and B, generated the abnormality detection information, and transmitted the abnormality detection information to server 4.

As illustrated in FIG. 12, controller 51a of server 4 displays a map on the display of terminal apparatus 5 in command center CC1. Controller 51a displays marker 61a that indicates the position of user A, on the map displayed on the display of terminal apparatus 5, based on the position of user A included in the abnormality detection information received from wearable camera WCA. Further, controller 51a displays marker 61b that indicates the position of user B, on the map displayed on the display of terminal apparatus 5, based on the position of user B included in the abnormality detection information received from wearable camera WCB.

When the mouse pointer of terminal apparatus 5 is moved on or around markers 61a and 61b, controller 51a displays the images of wearable camera WCA and WCB of users A and B corresponding to markers 61a and 61b, on the display of terminal apparatus 5.

For example, as illustrated in FIG. 12, it is assumed that mouse pointer 62 of terminal apparatus 5 is moved on marker 61a. Marker 61a is a marker indicating the position of user A. Accordingly, controller 51a overlays and displays image 63 included in the abnormality detection information received from wearable camera WCA of user A, on the map displayed on the display of terminal apparatus 5.

Note that it is assumed that user A fell in front of an entrance of a house. It is assumed that wearable camera WCA worn by user A has picked up an image in front of the entrance of the house where user A fell, and transmitted the image to server 4. Image 63 illustrated in FIG. 12 shows the entrance of the house where user A fell.

As described above, controller 51a of server 4 displays the position of the user in which abnormality has occurred and the picked-up image around the user, on the display of terminal apparatus 5 in command center CC1. This enables an operator in command center CC1 to know the position of the user in which abnormality has occurred and the condition around the user. In addition, the operator can issue a predetermined instruction to other user near the user in which abnormality has occurred.

Figure 13:
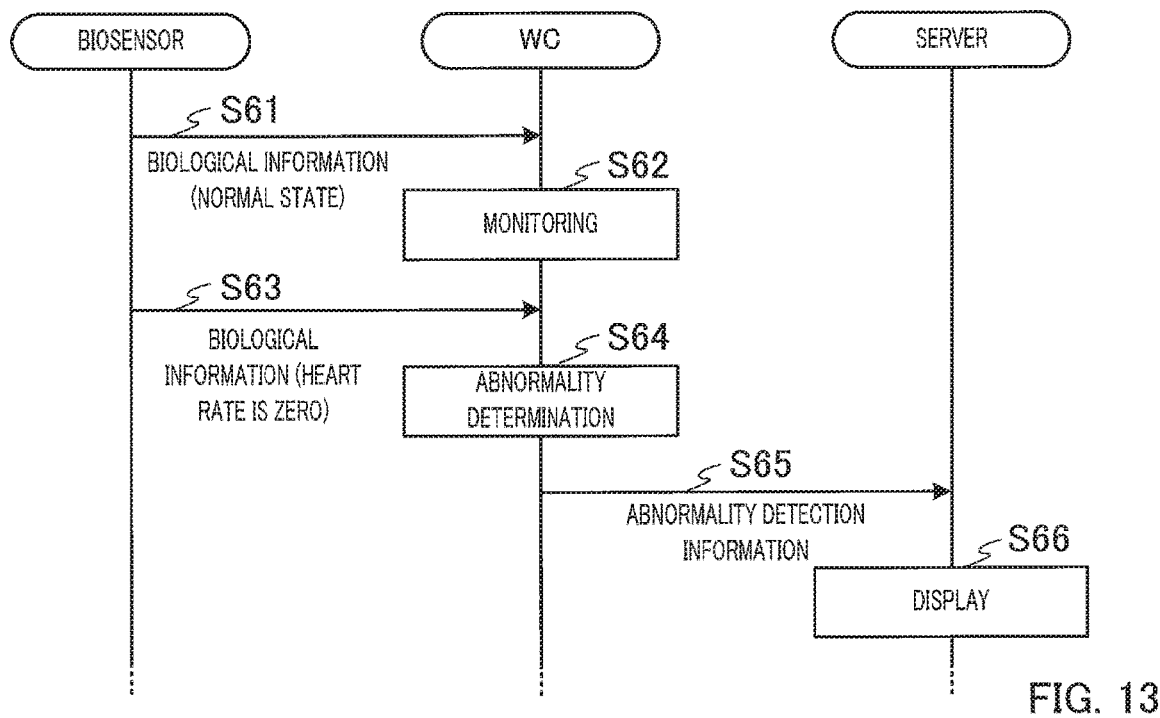
FIG. 13 is a sequence diagram to explain an example of operation to notify abnormality detection information.

FIG. 13 is a sequence diagram to explain an example of operation to notify the abnormality detection information. It is assumed that wearable camera (WC) 1 operates in the vital reaction mode.

Heart rate sensor 44, perspiration sensor 45, and temperature sensor 46 of biosensor 2 respectively measure the heart rate, the perspiration amount, and the body temperature of the user. Controller 41 transmits the biological information that includes the heart rate, the perspiration amount, and the body temperature measured by the respective sensors, to wearable camera 1 through short-range communicator 48 (step S61).

Short-range communicator 28 of wearable camera 1 receives the biological information transmitted in step S61. Controller 21 monitors the biological information received by short-range communicator 28, namely, determines whether the biological information is normal or abnormal (step S62). At this time, for example, when the heart rate included in the biological information is "zero", controller 21 determines that the biological information is abnormal.

Heart rate sensor 44, perspiration sensor 45, and temperature sensor 46 of biosensor 2 respectively measure the heart rate, the perspiration amount, and the body temperature of the user. Controller 41 transmits the biological information that includes the heart rate, the perspiration amount, and the body temperature measured by the respective sensors, to wearable camera 1 through short-range communicator 48 (step S63). Note that it is assumed that the biological information on the user transmitted in step S63 is abnormal (heart rate of "zero").

Short-range communicator 28 of wearable camera 1 receives the biological information transmitted in step S63. Controller 21 monitors the biological information received by short-range communicator 28 (step S64). Since the biological information transmitted in step S63 is abnormal, controller 21 determines that the biological information on the user wearing biosensor 2 is abnormal.

Since controller 21 determines that the biological information on the user is abnormal, controller 2.1 starts image pickup by camera 22. Controller 21 generates the abnormality detection information that includes the image picked-up by camera 22 and the position of wearable camera 1 (position of user wearing wearable camera 1) output from GPS receiver 30, and transmits the abnormality detection information to server 4 (step S65).

Controller 51a of server 4 receives the abnormality detection information transmitted from wearable camera 1 through communication interface 54. Controller 51a displays a marker indicating the position of the user or the image by camera 22, on the display of terminal apparatus 5 in command center CC1, based on the received abnormality detection information (step S66). This enables the operator in command center CC1 to know abnormality of the user.

Another notification example of the abnormality detection information is described. In a case where short-range wireless communication between wearable camera 1 and CTB 3a mounted on vehicle V1 is connected, it is regarded that the user wearing wearable camera 1 is located near vehicle V1. In contrast, in a ease where the short-range wireless communication between wearable camera 1 and CTB 3a is not connected, it is regarded that the user wearing wearable camera 1 is away from vehicle V1 and is not located near vehicle V1.

In a case where the user wearing wearable camera 1 is not located near vehicle V1, it is generally considered that the user walks or runs in a place away from vehicle V1 to perform patrol, investigation, or the like. Accordingly, it is considered that a moving speed of the user is, for example, 2 km/h to 20 km/h. When the moving speed of the user is 35 km/h or more, it is considered that the user has been taken away by someone with a vehicle, or the like.

Accordingly, wearable camera 1 monitors the connection state of the communication with CTB 3a mounted on vehicle V1. In a case where the connection with CTB 3a is disconnected, wearable camera 1 detects own moving speed (of wearable camera 1). In a case where the detected moving speed exceeds a predetermined speed, wearable camera 1 generates the abnormality detection information, and transmits the abnormality detection information to server 4.

Figure 14:
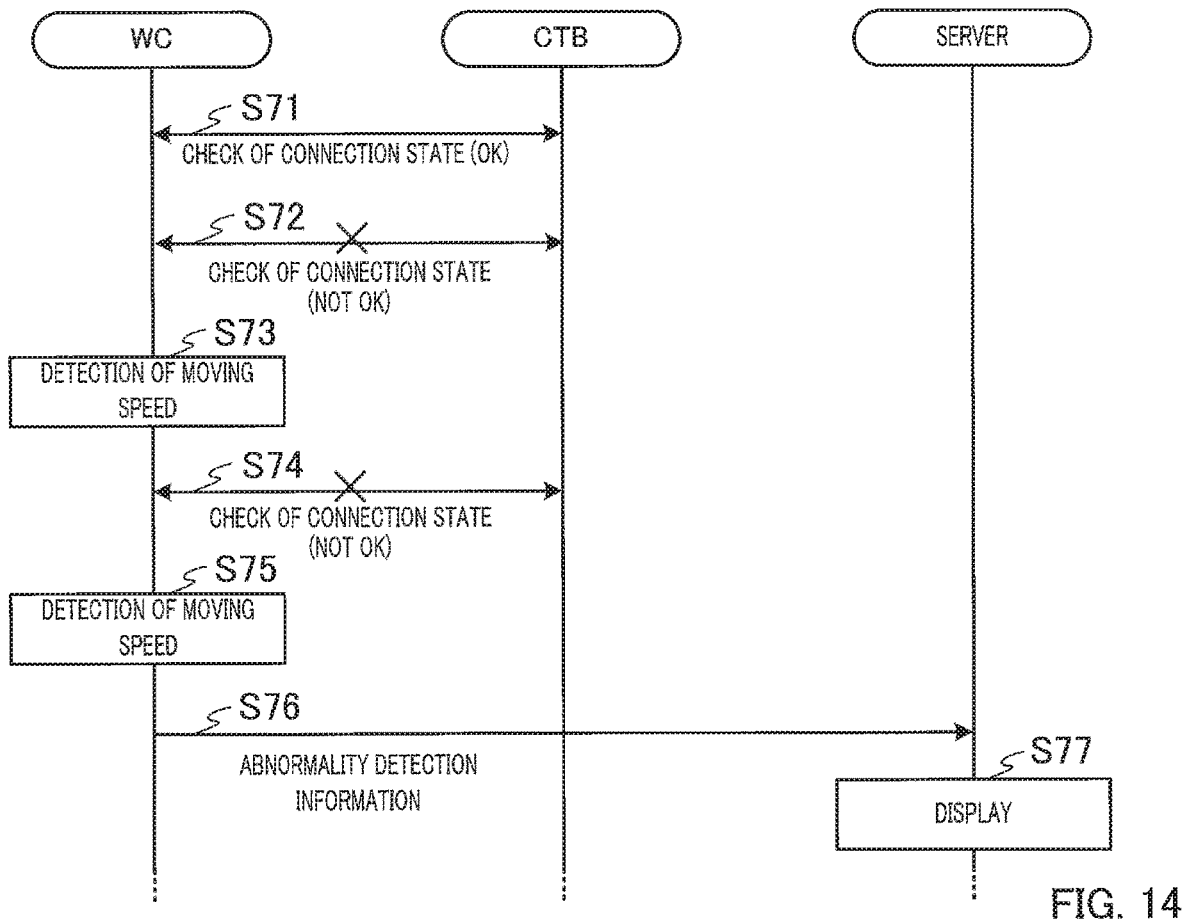
FIG. 14 is another sequence diagram to explain an example of the operation to notify the abnormality detection information.

FIG. 14 is another sequence diagram to explain an example of the operation to notify the abnormality detection information. It is assumed that wearable camera (WC) 1 operates in the vital reaction mode.

Controller 21 of wearable camera 1 checks whether the communication with CTB 3a is connected (step S71). At this time, it is assumed that the communication with CTB 3a is connected (OK).

Controller 21 of wearable camera 1 checks whether the communication with CTB 3*a* is connected (step S72). At this time, it is assumed that the communication with CTB 3*a* is disconnected (NG).

Since the communication with CTB 3*a* is disconnected in step S72, controller 21 detects the moving speed of wearable camera 1 (step S73). The moving speed can be calculated from, for example, the acceleration output from acceleration sensor 24 or the position output from GPS receiver 30.

When controller 21 detects the moving speed of wearable camera 1, controller 21 determines whether the detected moving speed exceeds the predetermined speed. At this time, controller 21 determines that the moving speed does not exceed the predetermined speed.

Controller 21 of wearable camera 1 checks whether the communication with CTB 3*a* is connected (step S74). At this time, it is assumed that the communication with CTB 3*a* is disconnected (NG).

Since the communication with CTB 3*a* is disconnected in step S74, controller 21 detects the moving speed of wearable camera 1 (step S75). At this time, controller 21 determines that the moving speed exceeds the predetermined speed.

Since the moving speed of wearable camera 1 exceeds the predetermined speed, controller 21 starts image pickup by camera 22. Controller 21 generates the abnormality detection information that includes the image picked-up by camera 22 and the position of wearable camera 1 output from GPS receiver 30, and transmits the abnormality detection information to server 4 (step S76).

Controller 51*a* of server 4 receives the abnormality detection information transmitted from wearable camera 1 through communication interface 54. Controller 51*a* displays the marker indicating the position of the user or the image of camera 22 on the display of terminal apparatus 5 in command center CC1, based on the received abnormality detection information (step S77). This enables the operator in command center CC1 to know abnormality of the user.

An operation example in a case where biosensor 2 is not present around wearable camera 1 is described. In a case where the biological information is not transmitted from biosensor 2 (in case where biological information is not received from biosensor 2), wearable camera 1 determines that biosensor 2 is not present around wearable camera 1. In addition, wearable camera 1 transmits the abnormality detection information that includes information indicating absence of biosensor 2 around wearable camera 1, to server 4. Server 4 displays the information indicating absence of biosensor 2 around wearable camera 1, on the display of terminal apparatus 5 in command center CC1. In response thereto, for example, the operator in command center CC1 can instruct the user to wear biosensor 2.

Figure 15:
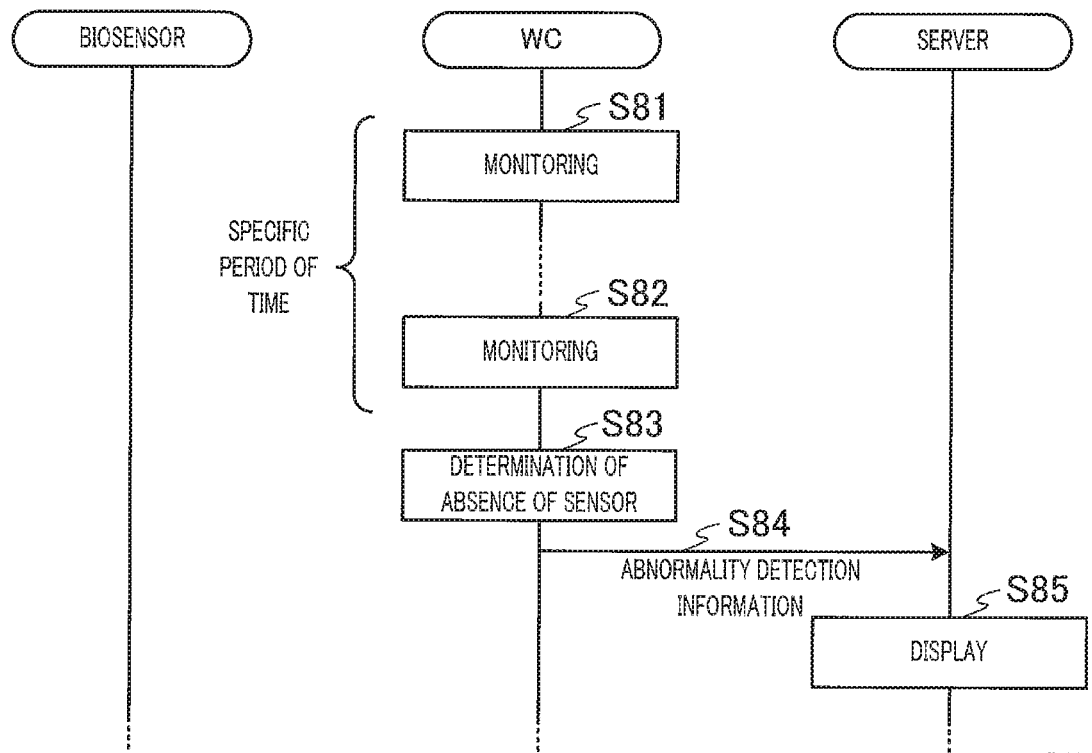
FIG. 15 is a sequence diagram to explain an example of operation to detect presence of the biosensor.

FIG. 15 is a sequence diagram to explain an example of operation to detect presence of biosensor 2. It is assumed that wearable camera (WC) 1 operates in the vital reaction mode.

Controller 21 of wearable camera 1 monitors whether the biological information has been received, for a specific period of time (steps S81 and S82). Note that it is assumed that the biological information is not transmitted from biosensor 2 and controller 21 does not receive the biological information.

Controller 21 determines that biosensor 2 is not present around wearable camera 1 because controller 21 cannot monitor the biological information for the specific period of time (step S83).

When controller 21 determines that biosensor 2 is not present around wearable camera 1, controller 21 generates the abnormality detection information that includes the information indicating absence of biosensor 2 around wearable camera 1, the position of the user, and the image picked-up by camera 22. Controller 21 transmits the generated abnormality detection information to server 4 (step S84).

Controller 51*a* of server 4 receives the abnormality detection information transmitted in step S84. Controller 51*a* displays the information indicating absence of biosensor. 2 around wearable camera 1 on the display of terminal apparatus 5 in command center CC1, based on the received abnormality detection information (step S85). This enables the operator in command center CC1 to know absence of biosensor 2 around wearable camera 1. Note that controller 51*a* may display the position of the user and the image picked-up by camera 22 on the display of terminal apparatus 5 in command center CC1, based on the abnormality detection information received in step S84.

An operation example in a case where biosensor 2 is present around wearable camera 1 but is not worn by the user is described. In a case where wearable camera 1 receives the biological information from biosensor 2 but the heart rate included in the biological information is "zero" after wearable camera 1 is turned on, wearable camera 1 determines that biosensor 2 is not worn by the user. Wearable camera 1 then transmits the abnormality detection information including information indicating that biosensor 2 is not worn by the user, to server 4. In response thereto, for example, the operator in command center CC1 can instruct the user to wear biosensor 2.

Figure 16:
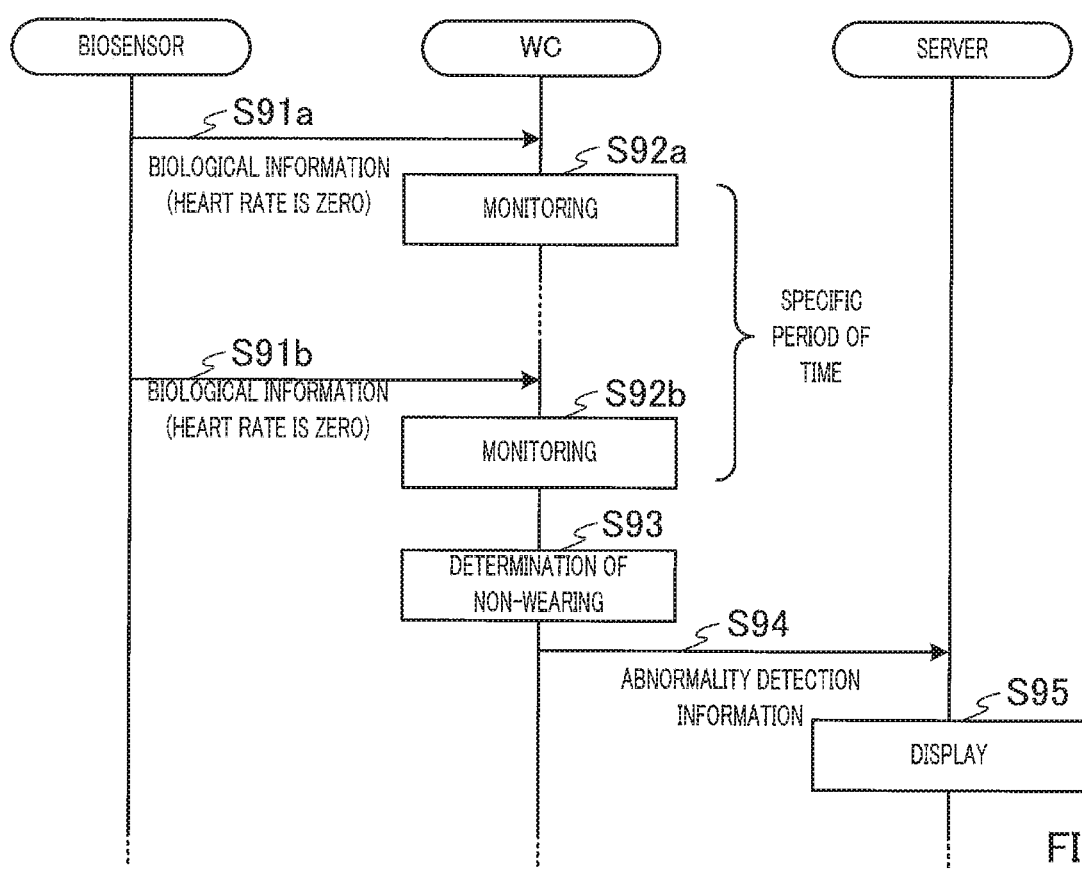
FIG. 16 is a sequence diagram to explain an example of operation to detect wearing of the biosensor.

FIG. 16 is a sequence diagram to explain an example of operation to detect wearing of biosensor 2. It is assumed that wearable camera (WC) 1 operates in the vital reaction mode.

Heart rate sensor 44, perspiration sensor 45, and temperature sensor 46 of biosensor 2 respectively measure the heart rate, the perspiration amount, and the body temperature of the user. Controller 41 transmits the biological information that includes the heart rate, the perspiration amount, and the body temperature measured by the respective sensors, to wearable camera 1 through short-range communicator 48 (steps S91*a* and S91*b*). Note that it is assumed that the heart rate included in the biological information transmitted in steps S91*a* and S91*b* is "zero".

Short-range communicator 28 of wearable camera 1 receives the biological information transmitted from biosensor 2 in steps S91*a* and S91*b* after wearable camera 1 is turned on. Controller 21 monitors the biological information received by short-range communicator 28 for the specific period of time, namely, determines whether the biological information is normal or abnormal (steps S92*a* and S92*b*).

In a case where the heart rate included in the biological information is wholly "zero" as a result of monitoring of the biological information for the specific period of time after wearable camera 1 is turned on, controller 21 determines that biosensor 2 is not worn by the user (step S93).

When controller 21 determines that biosensor 2 is not worn by the user, controller 21 generates the abnormality detection information that includes information indicating that biosensor 2 is not worn by the user, the position of the user, and the image picked-up by camera 22. Controller 21 transmits the generated abnormality detection information to server 4 (step S94).

Controller 51*a* of server 4 receives the abnormality detection information transmitted in step S94. Controller 51*a* displays the information indicating that biosensor 2 is not worn by the user, on the display of terminal apparatus 5 in command center CC1, based on the received abnormality detection information (step S95). This enables the operator in command center CC1 to know that biosensor 2 is not worn by the user. Note that controller 51a may display the position of the user and the image picked-up by camera 22 on the display of terminal apparatus 5 in command center CC1, based on the abnormality detection information received in step S94.

As described above, wearable camera 1 worn or owned by the user includes GPS receiver 30 that acquires the positional information, camera 22 that picks up an image in front of the user, short-range communicator 28 that receives the biological information on the user from biosensor 2 worn or owned by the user, controller 21 that generates the abnormality detection information including the positional information and the image picked-up by camera 22 in the case where abnormality of the user is detected based on the biological information, and communicator 29 transmitting the abnormality detection information to server 4 displaying at least one of the positional information and the image on the display of terminal apparatus 5. Accordingly, wearable camera 1 can notify the operator of occurrence of abnormality on the user through the display of terminal apparatus 5.

Further, server 4 communicating with wearable camera 1 worn or owned by the user includes communication interface 54 receiving the abnormality detection information that includes the positional information on the user and the image picked-up by wearable camera 1 and is transmitted from wearable camera 1 in the case where wearable camera 1 detects abnormality of the user based on the biological information transmitted from biosensor 2 worn or owned by the user, and controller 51a that displays a map on the display of terminal apparatus 5 and displays the position of the user and the image on the map. Accordingly, server 4 can notify the operator of occurrence of abnormality on the user through the display of terminal apparatus 5.

In the above description, server 4 displays the position of the user on the display of terminal apparatus 5 by the marker, and displays the image picked-up by camera 22 when the mouse pointer is located on or around the marker. Alternatively, server 4 may display the marker and the image on the display at a time.

Further, terminal apparatus 5 may include the function of server 4. For example, terminal apparatus 5 may receive the abnormality detection information from wearable camera 1, and display the positional information on the user and the image information on the display.

In the above description, controller 21 of wearable camera 1 generates the abnormality detection information when the heart rate is "zero"; however, the condition to generate the abnormality detection information is not limited thereto. Controller 21 of wearable camera 1 may generate the abnormality detection information when the heart rate is lower than a predetermined value, for example, when the heart rate is a value impossible during the normal state, such as a value less than "20".

In the description of the above-described sequence, wearable camera 1 operates in the vital reaction mode; however, wearable camera 1 may operate in the privacy mode. In addition, in Embodiment 2, wearable camera 1 may not include the privacy mode and may include only the vital reaction mode.

Each of the functional blocks used in the description of the above-described embodiments is typically implemented as an LSI that is an integrated circuit. These may be implemented individually as single chips or may be integrated into a single chip including a part or all of them. In this example, the term LSI is used; however, the terms IC, system LSI, super LSI, or ultra LSI may be also used depending on an integration degree.

Further, the method of implementing the circuit integration is not limited to LSI, and the circuit integration may be implemented by a dedicated circuit or a general-purpose processor. An FPGA (Field Programmable Gate Array) programmable after manufacturing of the LSI, or a reconfigurable processor in which connection and setting of a circuit cell inside the LSI are reconfigurable may be used.

When a technology for the circuit integration replacing LSI is developed by progressive or derivative semiconductor technology, the functional blocks may be integrated with use of the technology. Application of biotechnology or the like is a possibility.

INDUSTRIAL APPLICABILITY

The present disclosure is useful for the wearable camera that picks up an image based on the biological information on the user.

REFERENCE SIGNS LIST

1 Wearable camera
2 Biosensor
3a Common trigger box
3b On-vehicle camera
4 Server
5 Terminal apparatus
6 Network
V1 Vehicle
CC1 Command center
11, 12, 14, 15, 25, 47 Switch
13 Camera lens
16a to 16c LED
21, 41 Controller
22 Camera
23, 42 Gyro sensor
24, 43 Acceleration sensor
26 Microphone
27 Speaker
28, 48 Short-range communicator
29 Communicator
30 GPS receiver
31, 49 Storage apparatus
44 Heart rate sensor
45 Perspiration sensor
46 Temperature sensor
51 CPU
51a Controller
52 RAM
53 HDD
54 Communication interface
61a, 61b Marker
62 Mouse pointer
63 Image

The invention claimed is:

1. A wearable camera, comprising:
a manipulator that receives an operation performed by a user;
a camera that picks up an image;
a communicator that receives biological information on the user from a biosensor to be worn or owned by the user; and
a controller that makes a transition from a vital reaction mode to a privacy mode in a case where the manipulator receives an operation to specify the privacy mode, the vital reaction mode being a mode in which a recording of the image picked-up by the camera is started when the biological information becomes abnormal, and the privacy mode being a mode in which an image recording by the camera is not started even when the biological information becomes abnormal, wherein the controller starts the image recording by the camera in a case where an instruction to start the image recording is received from an on-vehicle monitoring apparatus mounted on a vehicle, even after the transition to the privacy mode.

2. The wearable camera according to claim 1, wherein the controller makes a transition to the vital reaction mode after a predetermined time elapses from the transition to the privacy mode.

3. The wearable camera according to claim 1, wherein the controller starts the image recording by the camera in a case where the manipulator receives an operation to start the image recording by the camera even after the transition to the privacy mode.

4. The wearable camera according to claim 1, wherein the controller makes a transition to the vital reaction mode in a case where the wearable camera moves a predetermined distance after the transition to the privacy mode.

5. The wearable camera according to claim 1, further comprising a storage apparatus that stores the image picked-up by the camera, wherein the image stored in the storage apparatus is not erasable from the storage apparatus.

6. The wearable camera according to claim 1, wherein the biosensor includes at least any one of a heart rate sensor, a perspiration sensor, and a temperature sensor, and the communicator receives at least any of a heart rate, a perspiration amount and a body temperature of the user, as the biological information.

7. The wearable camera according to claim 1, wherein the controller records a log that relates to the transition to the privacy mode at a time of the transition to the privacy mode, and the controller records a log that relates to cancel of the privacy mode at a time of the cancel of the privacy mode.

8. The wearable camera according to claim 1, wherein the controller records a time at which a transition to the privacy mode is made.

9. The wearable camera according to claim 1, wherein the controller records a time at which the privacy mode is cancelled.

10. A method for using a wearable camera, wherein the wearable camera includes a manipulator that receives an operation performed by a user, and a camera that picks up an image, and wherein the method comprises:

receiving biological information on the user from a biosensor to be worn or owned by the user; and making a transition from a vital reaction mode to a privacy mode in a case where the manipulator receives an operation to specify a privacy mode, the vital reaction mode being a mode in which a recording of the image picked-up by the camera is started when the biological information becomes abnormal, and the privacy mode being a mode in which an image recording by the camera is not started even when the biological information becomes abnormal, wherein the image recording is started by the camera in a case where an instruction to start the image recording is received from an on-vehicle monitoring apparatus mounted on a vehicle, even after the transition to the privacy mode.

* * * * *